May 9, 1967  B. R. KELLER, SR  3,318,074
GAS PIPELINE DRIP SYSTEM
Filed Aug. 16, 1965  2 Sheets-Sheet 1
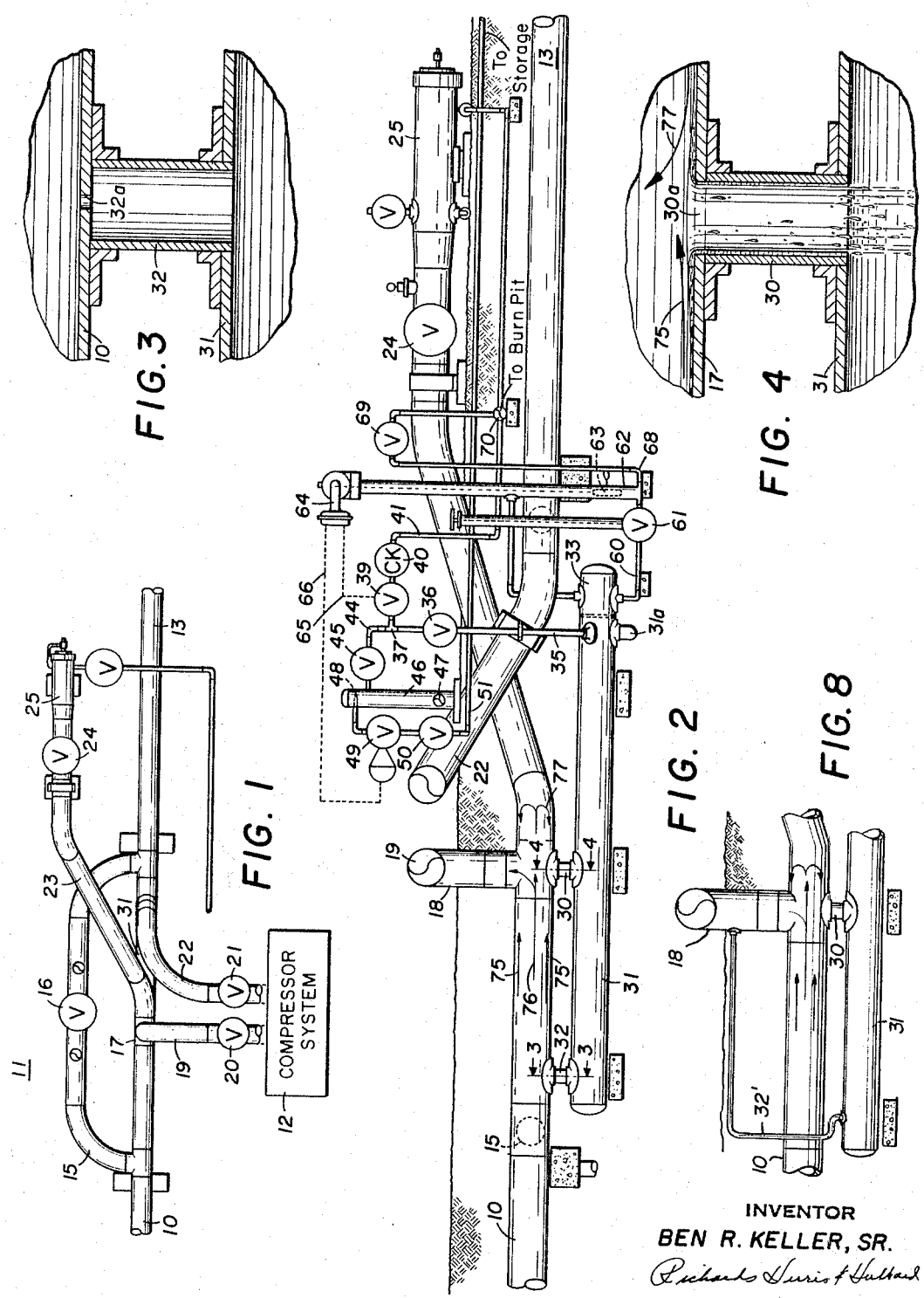
INVENTOR
BEN R. KELLER, SR.
ATTORNEY May 9, 1967  B. R. KELLER, SR  3,318,074
GAS PIPELINE DRIP SYSTEM
Filed Aug. 16, 1965  2 Sheets-Sheet 2
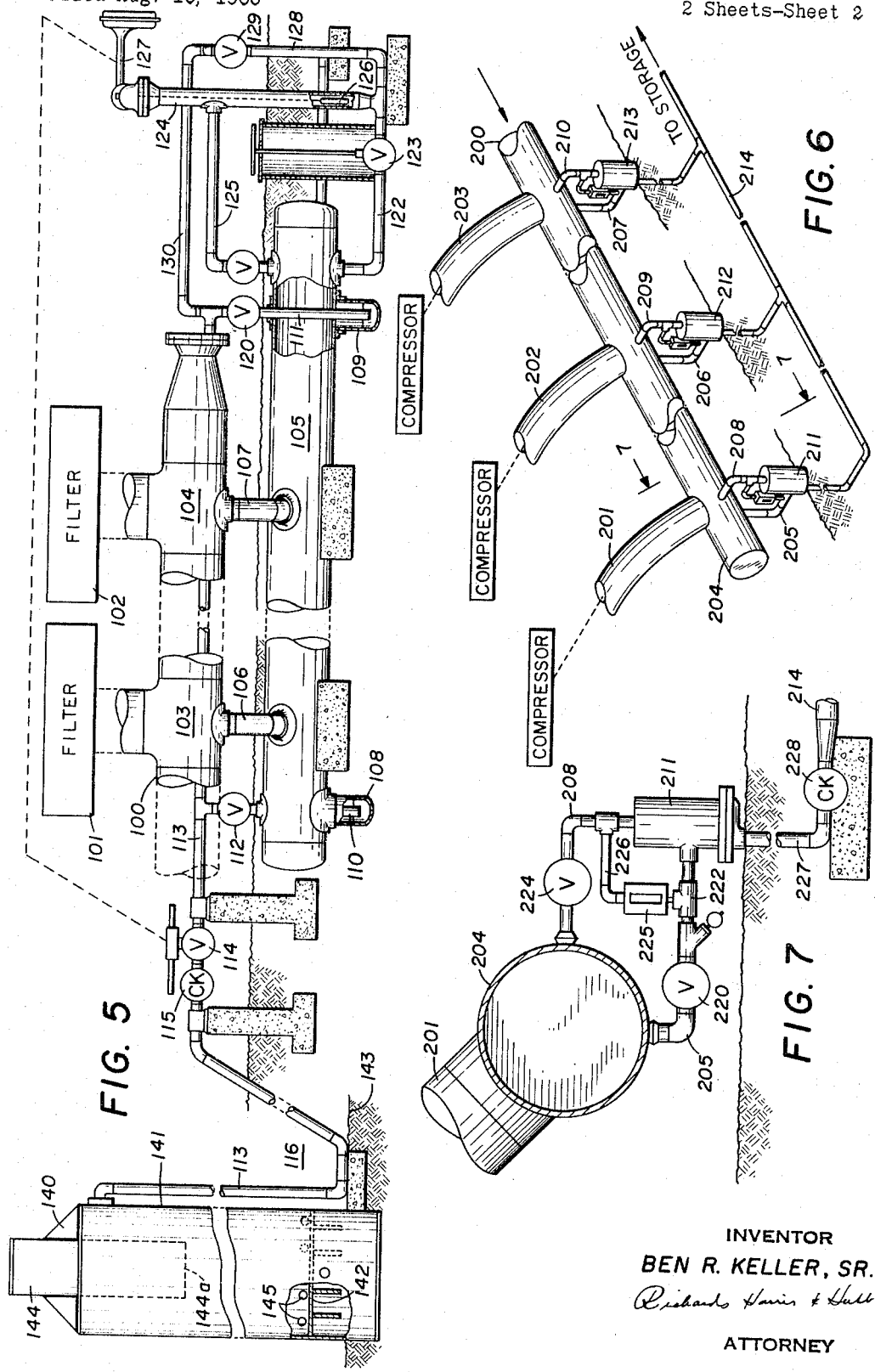
INVENTOR
BEN R. KELLER, SR.
ATTORNEY United States Patent Office 3,318,074
Patented May 9, 1967

3,318,074
GAS PIPELINE DRIP SYSTEM
Ben Robert Keller, Sr., 5221 Valerie,
Bellaire, Tex. 77401
Filed Aug. 16, 1965, Ser. No. 479,785
9 Claims. (Cl. 55—204)

This invention relates to removal of liquids in the operation of high pressure, large volumes gas pipelines, and more particularly to the installation of liquid flow channels in a pipeline at points which are characterized by liquid accumulation localized by a controlled gas flow pattern.

In the operation of high pressure gas pipelines, large quantities of condensate often are present. It is necessary and highly desirable that such liquids be removed from the pipeline for optimum operation of the pressurizing equipment and the filtering elements in the system. Heretofore, it has been the practice to install liquid traps at points spaced along a pipeline. However, there has not been an understanding of the nature of the liquid flow such as to permit the proper positioning of liquid flow lines. It has been discovered that the gas flow in a pipeline, at a point where the direction is abruptly changed, can be patterned such that liquid accumulates at the point of deviation under forces present by reason of laminar gas flow. Liquid flow is shaped by the gas flow in a closed end section of the pipeline which extends beyond the point of deviation. Liquid flow is controlled as to be directed into flow channels leading from the pipeline thereby preventing the gas from driving the liquid beyond the point of deviation.

In accordance with the present invention, liquid is removed from a high pressure gas pipeline by providing closure means for the end of the pipeline and a conduit for receiving gas flow from the pipeline at a point spaced from the end with an abrupt change in direction of gas flow at the point of direction change. A liquid reservoir is positioned below the pipeline and a flow channel leads to the reservoir from a port in the pipeline opposite the location of the conduit. Liquid tending to pile up at the point of change in direction of gas flow spills through the flow channel into the reservoir. Means are provided to dump and dispose of liquids from the reservoir.

For a more complete understanding of the present invention and for further objects and advantages thereof, reference may now be had to the following description taken in conjunction with the accompanying drawings in which:

FIGURE 1 is a top view of a simplified layout of a pipeline compressor station;

FIGURE 2 is an elevation view, partially in section, of the installation of FIGURE 1;

FIGURE 3 is a sectional view taken along lines 3—3 of FIGURE 2;

FIGURE 4 is a sectional view taken along lines 4—4 of FIGURE 2;

FIGURE 5 illustrates the use of the present invention in connection with a plurality of gas filter lines leading from a high pressure gas pipeline;

FIGURE 6 illustrates the use of the present invention in a multi-channel compressor intake manifold system;

FIGURE 7 is a sectional view showing the installation at the location of tap 201 of FIGURE 6; and FIGURE 8 is a modification of the system of FIGURE 2.

In FIGURE 1, a high pressure gas pipeline 10 enters a compressor station 11. Gas in the line is delivered, in station 11, to a compressor system 12 with the output of the compressor flowing to a station discharge line 13. The line 10, in one installation, was a thirty-inch diameter line with the pressure in the input line 10 at about 700 pounds per square inch and the pressure at the discharge line 13 in excess of 900 pounds per square inch and generally in the range between 900 and 1,000 pounds per square inch. Gas flow through the station in normal operations was of the order of 600,000,000 cubic feet per day. Transmission of gas under high pressures in this line was found to be accompanied by liquids entrained with the gas of such quantity as to cause a serious problem in gas handling. In the system of the above example, 500 to 600 barrels per day of condensate were present in the line. The present invention is directed to extraction of the liquids from the gas stream prior to entry into pressurizing equipment, such as compressors, or filter equipment or the like, used to assist in processing gas streams.

The line 10 is coupled to a bypass line 15 which includes a valve 16 therein so that the compressor system 12 may be bypassed when repairs are necessary or when the station is to be taken off stream. Downstream of the tap for line 15, a T 17 is provided leading to a riser 18 which in turn leads to a horizontal run 19. A valve 20 couples line 19 to the suction line in the compressor system 12. The discharge line 22 of the compressor system 12 includes valve 21 and leads to the station discharge line 13. The lines 10 and 13 normally are buried below the earth's surface. Line 10 is buried to the point of T 17 and then deviates away from the axis of the line 10 both in elevation and azimuth to the earth's surface, as along the section 23, and thence, by way of valve 24, to a trap 25. Pipeline instruments or control elements may thus be moved from line 10 through the section 23 and valve 24 into the trap 25.

The invention is particularly concerned with structure associated with the line 10 which in this installation is located in the region of the T 17. The structure for removing the condensate at this point is best illustrated in FIGURES 2-4. It has been found that, by reason of the laminar flow of gas in the line 10, as the gas approaches the change of direction at the T 17, liquids move along the line 10 with the gas, and tend to pile up at the point of the change of course in gas flow. This point would be at the center of the T 17, FIGURES 2 and 4. As best shown in FIGURE 4, turbulence and gas counter-flow is present because the gas stream tends to try to flow into the closed section 23. This phenomenon patterns the liquid flow, causing it to tend to pile up on the bottom of the T 17 at about the center thereof. Thus, in accordance with the present invention, a large diameter downcomer 30 is coupled to the bottom of the T 17 diametrically opposite the riser 18 to provide a liquid flow channel. The downcomer 30 leads to an elongated closed cylinder or reservoir 31 which is supported from the line 10 by a stub line 32 which opens into reservoir 31. A small orifice 32a, FIGURE 3, is formed in the wall of the line 10 for communication with the line 32. A full sized or large orifice 30a is provided for communication between the T 17 and the cylinder 31 through the downcomer 30. In the above example and as illustrated in FIGURES 2-4, the reservoir 31 was thirty inches in diameter and the downcomer 30 was ten inches in diameter, with a full opening 30a into the T 17. The stub line 32 was connected to the line 10 by way of a one-inch opening 32a.

By reason of the dynamic forces present in the pipeline at the change of course, where a stub line is also present, the accumulation of liquid at the point of direction change has been found to be such that removal of liquids is greatly facilitated. The orifice 32a into the downcomer 32 is provided for pressure equalization in the reservoir 31. By reason of the difference in size of the ports leading from the line 10 and the T 17, undesirable oscillations, heretofore experienced in drip units by reason of resonances involved, are avoided. The condensate spills into the reservoir 31 where it may be removed.

The condensate is dumped by use of a line 35 extending from reservoir 31 downward to near the bottom of a sump 31a. Sump 31a is located adjacent to the end 33 of the reservoir 31. The line 35 is employed to empty the reservoir 31 in response to a high liquid level therein. The line 35 passes by way of a full-opening valve 36 to a T 37. A line, leading from T 37, passes by way of a full-opening valve 39 and a check valve 40 to a line 41 which leads to a burning pit line 70. The valve 39 is a pneumatically operated valve which is employed to take care of unusual surges of liquid going into the cylinder 31. The valve 39 will be opened at a high control pressure and will reclose at an intermediate pressure. In the above example, valve 39 opened at 14 pounds per square inch and reclosed at six pounds per square inch.

Valve 39 forms part of a safety system provided for operation in conjunction with a filter which is fed by way of line 44 connected to T 37. Line 44 is connected to a valve 45 and thence to the input to a filter 46. The filter 46 is adapted for clean-out as by way of the access port 47. Liquid entering the filter 46 by way of line 44 is discharged from the filter 46 through a screen 48 and a channel which includes a pneumatically operated valve 49. From valve 49, the liquid flows through valve 50 to a line 51 which leads to a condensate storage tank.

Since the pressure in the line 10 and thus in the reservoir 31 is high, portions of the system (not shown) may readily provide instrument gas in the manner generally well known. Pneumatic control of valves 39 and 49 is provided by means which include a line 60 which leads from the bottom of the reservoir 31 by way of a valve 61 to a float chamber 62. A float 63 in the chamber 62 actuates a level control unit 64. The control unit 64 is coupled, as indicated by linkages 65 and 66, to valves 39 and 49, respectively. As above explained, the valve 39 will open at a pressure which is relatively high, for example, fourteen pounds per square inch, and will reclose at the lower pressure, for example, six pounds per square inch. When valve 39 is open, the fluid dumped from the reservoir 31 will be delivered to a burning pit. However, it is desired to recover and save the condensate extracted from the line 10. For this purpose, the valve 49 is controlled by way of linkage 66 as to be opened at, for example, nine pounds per square inch and to be closed at three pounds per square inch. Thus, normally, all of the liquid extracted from the reservoir 31 will pass through the filter 46 and will be delivered by way of line 51 to storage. The valve 39 will be opened only when quantities of liquid greater than the capacity of the filter 46 are encountered.

It will be noted that a rise 68 is connected between valves 61 and 69 and leads to line 70 terminating at a burning pit. By this means, the valve 61 and line 68 can be blown down.

From the foregoing, it will be seen that the extraction of condensate from a high pressure gas line is accomplished by locating downcomer 30 at a point in the line 10 where the course of the pipeline abruptly changes. Where a closed stub line is present beyond the point of deviation, the liquid is extracted, avoiding pile-up and entrainment with gas moving beyond the point of deviation. The pile-up is due to the gas movement toward T 17 as indicated by arrow 75. Near the surface of the line 10, gas velocity is less than the center velocity represented by the arrow 76. The gas flow in the closed stub line beyond the T 17 represented by arrow 77 causes liquid flow in the direction of arrow 75 to be arrested. Liquid tends to pile up at the location corresponding with the point of deviation. By this means, the compressor system 12 of FIGURE 1 can be maintained free from liquids and attendant difficulties.

In FIGURES 1 and 2, the pipeline has single conduits leading to and from compressor unit 12. In FIGURE 5, an installation is shown where a pipeline 100 leads to two filter units 101 and 102 (shown schematically). Filters often must be operated alternately. The lines 103 and 104 leading to units 101 and 102, respectively, are tapped into the line 100 at spaced points. In accordance with this embodiment of the invention, the liquid reservoir 105, in the form of an elongated cylinder, spans the distance between the two lines 103 and 104. Two downcomers 106 and 107 are provided. Downcomer 106 is axially aligned with the line 103 and downcomer 107 is aligned with the line 104. The downcomers 106 and 107 enter the reservoir 105 at an angle so that the reservoir 105 is offset to one side of the line 100. The reservoir 105 has two sumps 108 and 109. Risers 110 and 111 extend downwardly through the upper wall of the reservoir 105 to points near the bottoms of the sumps 108 and 109, respectively. Line 110 is connected, by way of a valve 112, to a line 113 which leads by way of a pneumatically operated valve 114 and a check valve 115 to a burning pit 116. Similarly, the riser 111 is connected by way of a valve 120 to the line 113. A level control line 122 is connected by way of a surface operated valve 123 to a float chamber 124. A return line 125 leads to the top of the reservoir 105 so that the float 126 may be actuated to control unit 127. A blow-down line 128 and valve 129 lead to the line 130 which is coupled to burning pit line 113.

The valve 114 is controlled by the control unit 127 in response to the liquid level in the reservoir 105. The two downcomers 106 and 107 are located immediately below the points at which the gas flow changes course. When filter 101 is employed to treat the gas in line 100, the liquid flow to the reservoir 105 will be by way of downcomer 106. However, if filter 102 is on stream, then the liquid flow to the reservoir 105 will be by way of downcomer 107.

A burn pit tower 140 is connected to the line 113. The tower 140 comprises a large vertically oriented cylinder 141 having a bottom plate 142. The cylinder 141 is planted in the bottom of the burn pit to the level of the floor 143 of pit 116. A stack 144 extends through the closed top of the cylinder 141 to a depth 144a well below the entry of line 113 to provide a vent for gas introduced into the burn tower 140. A plurality of holes 145 pass through the wall of the cylinder 141 immediately above the plate 142.

The line 113 enters the cylinder 141 tangentially so that the flow of liquids and gas will sweep down the sides in a spiral course. The liquid flows to the bottom and, at a relatively low velocity, through the holes 145 while the gas escapes through the stack 144.

In FIGURES 6 and 7, an installation involving the present invention is provided for feeding a plurality of compressors from a single header while eliminating entrained liquids to assure dry compressor operation. A header 200 is provided with a plurality of lines 201, 202 and 203 which extend outwardly at 90° and upwardly at an angle of about 45° to the suction lines on three separate compressors. The header is characterized by blind section 204 which extends beyond the juncture of the line 201 and the header 200. Downcomers 205, 206, and 207 are located on the underside of the header 200 immediately below the point at which suction lines 201, 202 and 203, respectively, are tapped into the header. Equalizing lines 208, 209 and 210 extend upward from drain units 211–213 and into the header 200 for pressure equalization. The installation at the juncture of each of the taps 201–203 includes liquid drain units 211, 212, and 213 which automatically deliver accumulations of liquid to a line 214 extending to a condensate storage tank (not shown).

The installation for tap line 201 in the header 220 is illustrated in detail in FIGURE 7. The downcomer 205 is connected by way of a valve 220 and a T 222 to the input of the automatic liquid drain unit 211. Equalizing line 208 is connected from the top of the unit 211 into the side of the header 200 by way of valve 224. A liquid level sight gauge 225 is connected between the T 222 and to the line 208 by way of line 226. The discharge line 227 from the drain unit 211 extends by way of a check valve 228 to the line 214.

The downcomer 205 is installed where the course of gas flow in the header 200 changes both in azimuth and elevation. The line 201 leads upwardly at an angle of about 45° from the header 200 and extends at right angles to the axis of the header 200. Gas flow along the header 200 will cause the liquid to accumulate at the site of the downcomer 205 where it dumps into the drain unit 211. If line 201 is closed, the liquid will dump into drain unit 212. Thus, all the compressors will be shielded from liquid flow. Only dry gas will be delivered to the compressor units.

In FIGURE 2, the pressure equalizing line 32 is connected to line 19 at port 32a. In contrast, in FIGURE 8, the line 32 is connected to the conduit 18 through a suitable port. Both the latter port and the port 32a of FIGURE 2 are spaced from the point to which the downcomer 30 is located.

In the embodiment of the invention illustrated in FIGURES 1 and 2, the valve 39 was a two-inch 600 p.s.i. ASA ball valve manufactured and sold by Cook Valve Company, of Erin, Tenn. The actuator was of the type manufactured and sold by EIM Actuator Company, of Houston, Tex. Valve 49 was a two-inch 600 p.s.i. ASA, type RJ-21-60 regulator valve manufactured and sold by Texsteam Corporation, of Houston, Tex. The control unit 64 was a four-inch 600 p.s.i. ASA Fisher Leveltron No. 2500-24 BP manufactured and sold by Fisher Governor Company, Marshalltown, Iowa.

In the header installation illustrated in FIGURE 5, the liquid drain unit was a one-inch Armstrong liquid drainer, No. 2313 HL 5-1,000 p.s.i. unit, manufactured and sold by Armstrong Machine Works, of Three Rivers, Mich.

Having described the invention in connection with certain specific embodiments thereof, it is to be understood that further modifications may now suggest themselves to those skilled in the art and it is intended to cover such modifications as fall within the scope of the appended claims.

What is claimed is:
1. Liquid removal means for a high pressure gas pipeline which comprises:
    (a) an unobstructed pipeline section having a closure means at the end thereof,
    (b) conduit means extending upward from said pipeline section for directing a continuous flow of gas from said pipeline at a point spaced from said end with an abrupt change in direction of gas flow at said point,
    (c) a liquid reservoir positioned below said point, and
    (d) a flow channel leading to said reservoir from a bottom opening in said pipeline section located directly opposite the location of said conduit.
2. The combination set forth in claim 1 in which a pressure equalizing line extends from said reservoir to a port in said conduit, where said port is spaced from said point.
3. The combination set forth in claim 1 in which a pressure equalizing line extends from said reservoir to a port in said pipeline section spaced from the location of said conduit.

4. The combination sea forth in claim 1 in which means including liquid level sensing means coupled to said reservoir dumps liquid accumulations from said reservoir.
5. A system for removal of liquid from a high pressure gas header having multiple conduits leading therefrom which comprises:
    (a) an unobstructed header section having a closed end and positioned in a substantially horizontal run with said conduits coupled to said header at points spaced from each other and from said end along said run substantially at right angles with a course at least partially upwardly directed,
    (b) a reservoir means positioned below said header, and
    (c) flow channels leading between said header and said reservoir means from points in the bottom of said header substantially directly aligned with at least the two of said conduits located next adjacent to said closed end.
6. The combination set forth in claim 5 in which means coupled to said reservoir means are provided for automatically dumping liquid accumulations therefrom.
7. The combination set forth in claim 5 in which said reservoir means comprises a single container with liquid level responsive means coupled thereto to dump liquid accumulations therefrom.
8. The combination set forth in claim 5 in which said reservoir means comprises separate storage and dump means connected to each of said flow channels.
9. In combination:
    (a) a high pressure gas pipeline having an unobstructed horizontal run with a closed end,
    (b) a conduit for directing a continuous gas flow from said pipeline at a point spaced from said end with an abrupt upwardly directed change in the direction of gas flow at said point,
    (c) a liquid reservoir positioned below said pipeline,
    (d) a flow channel leading to said reservoir from a port in the bottom of said pipeline at the location of said conduit,
    (e) a discharge line leading from said reservoir to a disposal location,
    (f) a vertical cylindrical tower at said disposal location with said discharge line having tangential entry near the top thereof,
    (g) means including a stack closing said top with said stack extending below said entry,
    (h) a bottom closure plate for said tower,
    (i) liquid flow ports in the wall of said tower immediately above said plate, and
    (j) liquid level responsive means coupled to said reservoir for controlling flow from said reservoir to said tower.

References Cited by the Examiner
UNITED STATES PATENTS

| | | | |
|---|---|---|---|
| 2,507,273 | 5/1950 | Schultz | 55—219 |
| 2,557,788 | 6/1951 | Kisling | 55—465 X |
| 2,614,648 | 10/1952 | Wilson | 55—199 X |
| 2,812,034 | 11/1957 | McKelvey | 55—199 X |
| 3,176,501 | 4/1965 | Briggs | 55—456 X |

FOREIGN PATENTS
1,325,556    3/1963    France.

REUBEN FRIEDMAN, *Primary Examiner.*
R. W. BURKS, *Assistant Examiner.*